United States Patent [19]

Basey, Jr. et al.

[11] 4,083,579
[45] Apr. 11, 1978

[54] COLLAPSIBLE INFANT'S STROLLER

[75] Inventors: Otis Basey, Jr.; Roy E. Knoedler, both of Columbus, Ind.

[73] Assignee: Cosco, Inc., Columbus, Ind.

[21] Appl. No.: 756,132

[22] Filed: Jan. 3, 1977

[51] Int. Cl.² .............................................. B62B 11/00
[52] U.S. Cl. .................................................. 280/650
[58] Field of Search .......................... 280/42, 649, 650

[56] References Cited

U.S. PATENT DOCUMENTS

| 3,917,302 | 11/1975 | Gebhard | 280/650 |
| 3,995,882 | 12/1976 | Watkins | 280/42 |
| 4,030,769 | 6/1977 | Peng et al. | 280/42 |

*Primary Examiner*—Robert R. Song
*Attorney, Agent, or Firm*—Jenkins, Coffey & Hyland

[57] ABSTRACT

A collapsible infant's stroller has a pair of elongated tubular side frames each with a front wheel at its lower end. A fabric seat is supported upon the side frames and upon a pair of side struts, with said struts being pivotally connected to the side frames and extending forwardly therefrom. The side struts also extend rearwardly and downwardly from the side frames and have rear wheels connected to their lower ends. A bottom X-frame pivotally interconnects the side frames and the side struts adjacent their respective wheels, and a rear X-frame pivotally interconnects the side struts adjacent the rear wheels with slide lock assemblies on the side frames above the fabric seat. The slide lock assemblies have cam levers receivable in slots in said side frames for locking the stroller in an unfolded operating position. When released from the slots, the slide lock assemblies are slidable along the side frames for moving the stroller to a low-profile folded position with the bottom and rear X-frames disposed end-to-end in substantially the same plane.

22 Claims, 11 Drawing Figures

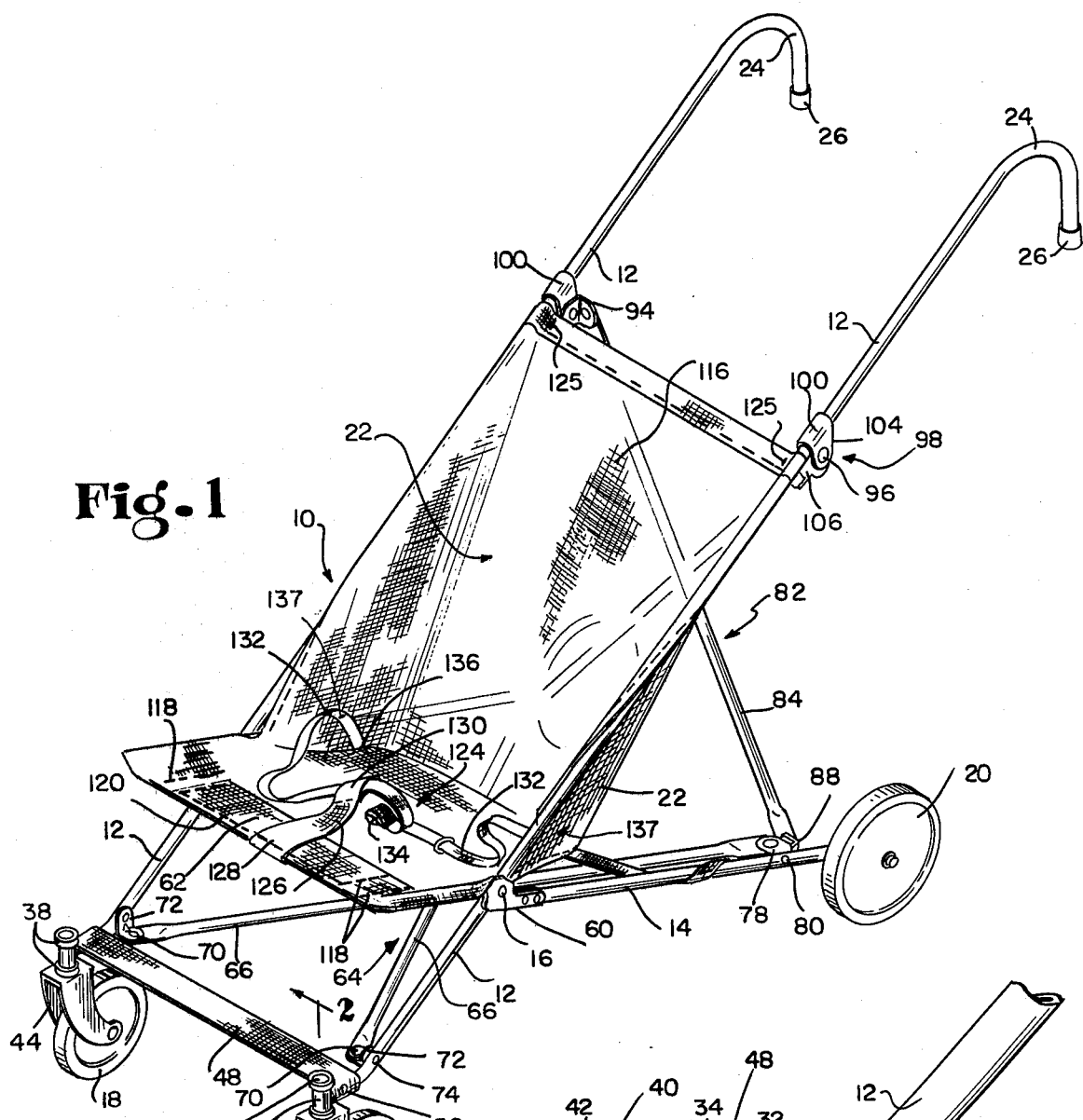
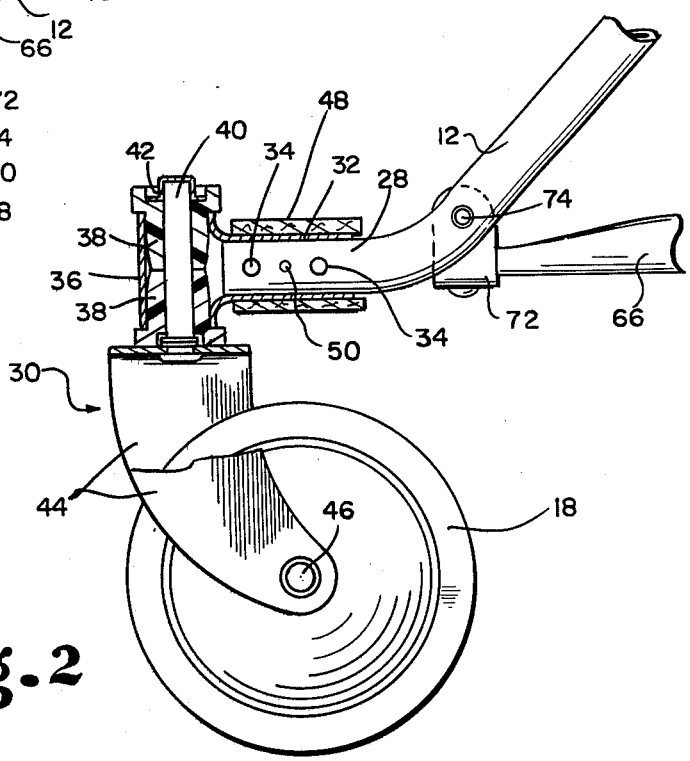
Fig. 1
Fig. 2

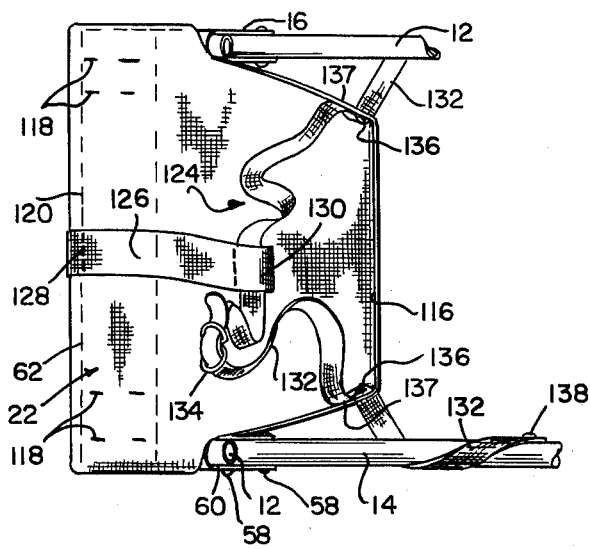
Fig. 4
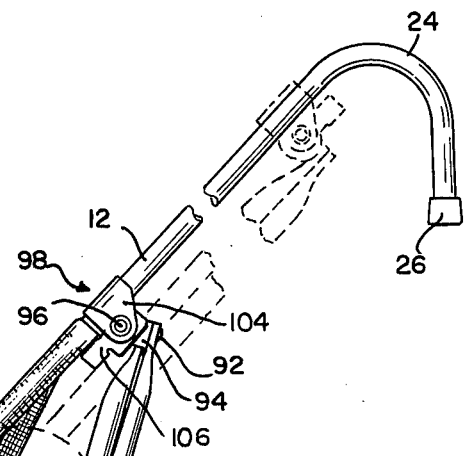
Fig. 3
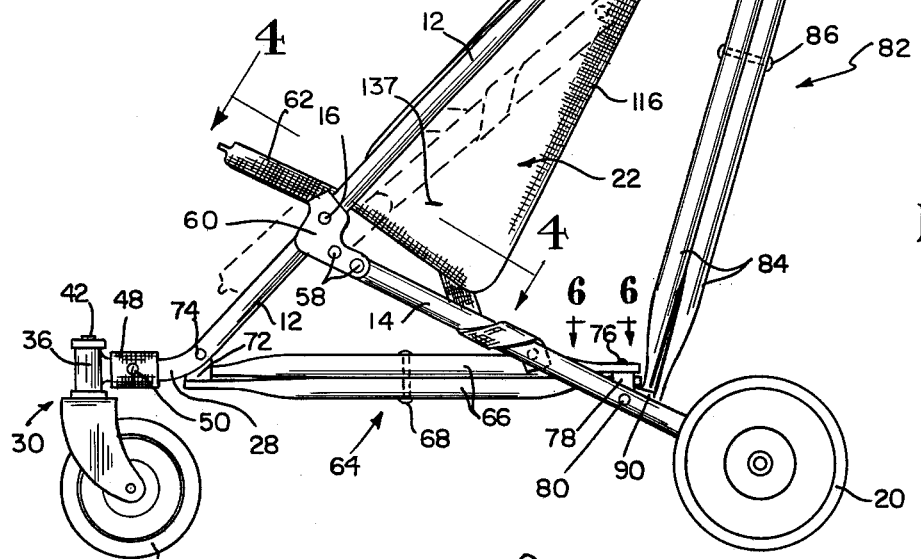
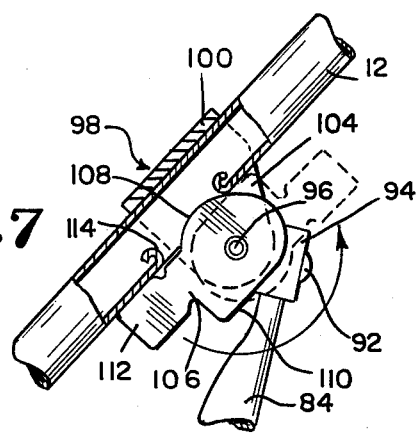
Fig. 7
Fig. 6

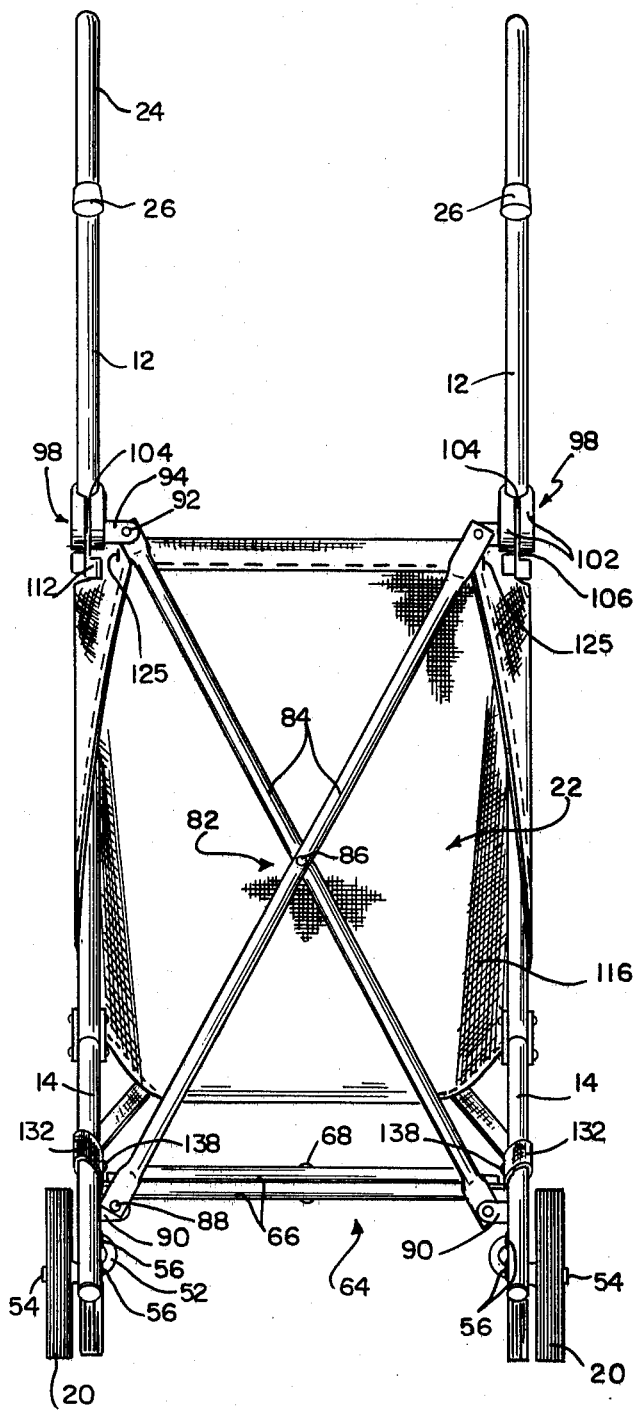
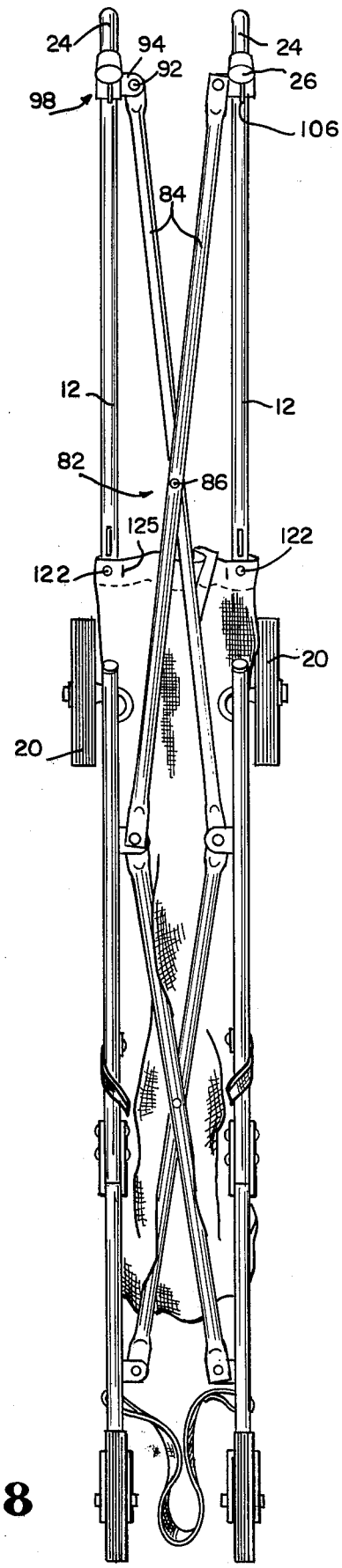
Fig. 5
Fig. 8

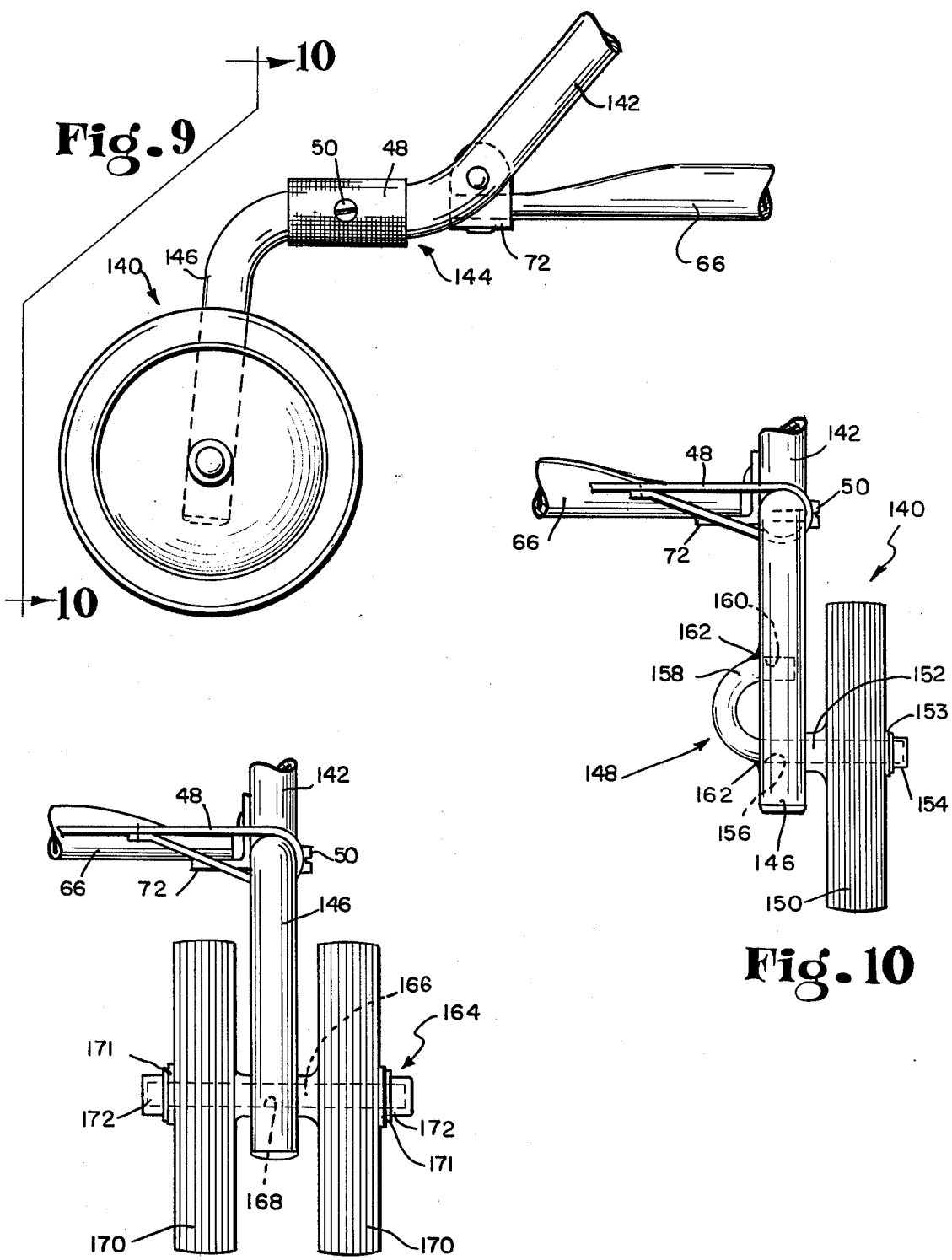

COLLAPSIBLE INFANT'S STROLLER

BACKGROUND OF THE INVENTION

This invention relates to strollers for infants. More specifically, this invention relates to a lightweight, collapsible infant's stroller which is quickly and easily movable between an unfolded operating position and a low-profile folded position.

Collapsible infant's strollers are well known in the prior art, and have become increasingly popular in recent years with the advent of so-called umbrella strollers. Strollers of this type typically comprise a lightweight tubular folding framework having wheels and a lightweight fabric seat. These strollers are designed for quick and easy movement between an operating position and a relatively compact folded position for easy transporting. Such strollers have been found to be advantageous over older, more conventional types of infant's strollers which are heavier and bulkier in design.

Umbrella-type collapsible strollers of the prior art have not been totally satisfactory in that they have not provided a lightweight mechanical framework of sufficient rigidity for prolonged use over a period of years. For example, many of such strollers require a framework having two-part side frames which fold upon themselves to assume a collapsed position. See U.S. Pat. Nos. 3,390,893 and 3,871,738. In an operating position, the side frames are laterally spaced by a toggle link. However, over a period of time, the toggle link tends to work loose and thereby allows the side frames to become loose with the stroller in an operating position. In some instances, the toggle link has been known to disengage suddenly during use whereby the stroller without warning tends to move to a collapsed position. This is highly undesirable when a small infant is in the stroller.

Some prior art strollers have used various sliding joint connections in an effort to obtain greater frame rigidity by eliminating fold-over tubing constructions. See, for example, U.S. Pat. No. 3,024,035. Such strollers use the sliding joint connections to allow portions of the framework to slide with respect to a pair of elongated rigid side frames. However, such prior art strollers have resulted in a folded construction with the front and rear wheels folded on top of each other on opposite sides of the side frames. This folded construction is not ideally compact, and requires additional locking means for maintaining the stroller in a folded position. Moreover, prior art strollers having sliding joint connections have not eliminated toggle links for laterally spacing the side frames in an operating position, and accordingly have not eliminated the tendency of these toggle links to work loose during operation.

This invention provides an improved lightweight collapsible infant's stroller which is quickly and easily moved between operating and folded positions, and which has locking means for positively maintaining the stroller in an operating position. Further, this invention provides a collapsible stroller which, when folded, assumes a low-profile compact configuration, and does not require separate locking means for maintaining the stroller in a folded position.

SUMMARY OF THE INVENTION

In accordance with the invention, a collapsible infant's stroller has a pair of elongated parallel tubular side frames each having a front wheel carried at its lower end. A fabric seat is connected to the side frames and to a pair of side struts pivotally connected to the side frames intermediate the lengths of said side frames and extending generally forwardly therefrom. Said side struts also extend rearwardly and downwardly from the side frames for connection to a pair of rear wheels. A bottom X-frame pivotally interconnects the side frames and the side struts adjacent the wheels respectively carried thereon. A rear X-frame pivotally interconnects the side struts adjacent the rear wheels and a pair of lock assemblies slidably mounted on the side frames above the seat. Each lock assembly has a cam lever with a cam surface receivable in a slot in the adjacent side frame to lock the structure in an unfolded operating position.

The stroller is moved to a folded position by releasing the cam levers to allow the lock assemblies to slide away from the seat along the side frames. This collapses the side frames laterally inwardly toward each other and moves the side struts to a position generally parallel with the side frames. Simultaneously, this moves the bottom and rear X-frames to end-to-end positions generally in a common plane substantially parallel with and adjacent to the side frames.

BRIEF DESCRIPTION OF THE DRAWINGS

The accompanying drawings illustrate the invention. In such drawings:

FIG. 1 is a perspective view of a stroller of this invention in an unfolded operating position;

FIG. 2 is an enlarged fragmented vertical section taken on the line 2—2 of FIG. 1, with portions thereof broken away;

FIG. 3 is a side elevation view of the stroller of FIG. 1;

FIG. 4 is a fragmented section taken on the line 4—4 of FIG. 3;

FIG. 5 is a rear elevation view of the stroller of FIG. 1;

FIG. 6 is an enlarged fragmented horizontal section taken on the line 6—6 of FIG. 3;

FIG. 7 is an enlarged fragmented side view of a portion of the stroller, with portions thereof broken away;

FIG. 8 is a rear elevation view of the stroller in a folded position;

FIG. 9 is an enlarged side fragmented elevation view similar to FIG. 2 showing an alternate embodiment of the invention;

FIG. 10 is a front elevation view of the embodiment of FIG. 8 taken on the line 10—10 of FIG. 9; and FIG. 11 is an enlarged fragmented side elevation view similar to FIG. 2 and showing still another embodiment of the invention.

DETAILED DESCRIPTION OF THE PREFERRED EMBODIMENT

A collapsible infant's stroller 10 of this invention is shown in an unfolded operating position in FIG. 1, and generally comprises a pair of elongated parallel side frames 12 each formed from an uninterrupted length of lightweight metal tubing or the like. Each of the side frames 12 has a side strut 14 pivotally connected thereto by a rivet 16. The side frames 12 have a pair of front wheels 18 at their lower ends, and the side struts 14 have a pair of rear wheels 20 at their lower ends. The side frames 12 and the side struts 14 together support a seat 22 formed from a flexible fabric such as vinyl or woven plastic. Conveniently, the upper ends of the side frames 12 are curved downwardly to form umbrella-type handles 24 which are easily grasped for pushing of the stroller. If desired, the ends of the handles 24 are closed by plastic caps 26.

As shown in FIG. 1 in the unfolded operating position, the side frames 12 extend from the handles 24 angularly downwardly and forwardly toward the front wheels 18. The lowermost end 28 of each of the side frames 12 is turned horizontally forwardly, as shown in detail in FIG. 2, for connection to a wheel assembly 30 including one of the front wheels 18. More specifically, the wheel assembly 30 comprises a one-piece bracket having a horizontally extending sleeve 32 received over the end 28 of the side frame and fixed in position by a pair of rivets 34. The horizontal sleeve 32 is formed integrally with a vertically extending wheel sleeve 36. The wheel sleeve 36 has upper and lower elastomeric bushings 38 received therein in opposed relation for positioning a wheel post 40 between an upper locking cap 42 and a downwardly extending wheel housing 44. The wheel housing 44 has a horizontally extending axle 46 about which the front wheel 18 is rotatably received. In this manner, each of the two front wheels 18 is rotatable about its axle 46 and is allowed to freely swivel about the vertical axis of the associated wheel post 40 carried within the bushings 38. Conveniently, a flexible fabric footrest 48 is wrapped about and extends transversely between the opposed lowermost ends 28 of the side frames and the sleeves 32 of the wheel assemblies 30, and is fixed in position by screws 50. As shown, the footrest 48 is stretched relatively tight between the opposed side frames when the stroller is in the unfolded operating position.

As shown in FIGS. 1 and 3-5, the side struts 14 each comprise a length of metal tubing extending generally angularly forwardly and upwardly from the associated rear wheel 20 when the stroller is in the operating position. Each rear wheel 20 is rotatably received on one leg of a U-shaped axle 52 between the adjacent side strut 14 and a locking hub cap 54. The axle 52 extends through a hole (not shown) in the side strut 14, and has its other leg received in an adjacent hole in the side strut (also not shown). The axle is solidly fixed to the side strut at both of the holes by welds 56.

The front end of each side strut 14 is rigidly joined by a pair of rivets 58 to a bracket 60. The bracket 60 extends on both sides of the adjacent side frame 12, and is pivotally connected thereto by the rivet 16. From the rivet 16, the bracket 60 extends forwardly and slightly upwardly for supporting a base portion 62 of the seat 22, as will be hereafter described in more detail.

The side frames 12 and the side struts 14 are interconnected near their respective front and rear wheels 18 and 20 by a bottom X-frame 64. The bottom X-frame 64 comprises a pair of tubular arms 66 centrally and pivotally connected one on top of the other by a pivot pin 68. The front ends of the two arms 66 of the bottom X-frame 64 are pivotally connected by rivets 70 to the horizontally extending legs of a pair of L-shaped brackets 72 which in turn have vertically extending legs pivotally connected by rivets 74 to the inside faces of the side frames 12 adjacent the footrest 48. From the front brackets 72, the X-frame arms 66 extend diagonally and horizontally rearwardly across the bottom of the stroller for connection to the side struts 14 slightly in front of and above the axles 52 of the rear wheels 20. More specifically, as shown also in FIG. 6, the X-frame arms 66 have their rear ends pivotally connected by rivets 76 to the horizontally extending legs of a pair of L-shaped brackets 78 which in turn have vertically extending legs pivotally connected by rivets 80 to the inside faces of the side struts 14. Conveniently, the front and rear ends of the X-frame arms 66 are flattened as shown for easy connection to their respective brackets. Moreover, one of the arms 66 is connected to the top side of its respective brackets and the other of said arms is connected to the bottom side of the brackets so that bowing of the arms is not necessary and to allow the arms to freely pivot about the pivot pin 68 for movement of the stroller between folded and unfolded positions.

The side struts 14 and the side frames 12 are also interconnected by a rear X-frame 82 extending from the side struts 14 adjacent the rear wheels 20 to above the fabric seat 22. The rear X-frame 82 comprises a pair of tubular arms 84 which are centrally and pivotally connected in adjacent planes by a pivot pin 86. The lowermost ends of the arms 84 of the rear X-frame 82 are each pivotally connected by a rivet 88 to one leg of a lower L-shaped bracket 90. The brackets 90 in turn each have a vertically extending leg pivotally connected in abutting relation with one of the rear brackets 78 of the bottom X-frame 64 and with respect to the adjacent side strut 14 by a rivet 80. From the brackets 90, the arms 84 extend diagonally upwardly and slightly rearwardly across the rear of the stroller. The X-frame arms 84 each have their upper ends pivotally connected by a rivet 92 to one leg of an upper L-shaped bracket 94 which in turn has its other leg pivotally connected by a rivet 96 to a slide lock assembly 98 mounted on the adjacent side frame 12. Again, the upper and lower ends of the X-frame arms 84 are flattened for easy connection to the brackets 90 and 94, and the two arms 84 are pivoted on opposite sides of their respective brackets to allow free movement of the stroller between folded and unfolded positions.

The slide lock assemblies 98 are shown in detail in FIG. 7, and each comprises a relatively rigid sleeve 100 wrapped about the side frame 12. Desirably, each of the sleeves 100 is formed from a plastic material such as an acetal resin of the type sold under the trademark Delrin of the E. I. DuPont NeMours Co., Inc. The sleeves 100 each have a pair of depending cheeks 102 through which the bracket rivet 96 is received. The two cheeks 102 are spaced apart to leave a vertical slot 104 for reception of a cam lever 106 rotatably carried on the rivet 96. The cam lever 106 is formed from metal or the like, and has a rounded, radially outwardly protruding cam surface 108 on one side and a flat non-protruding surface 110 on its opposite side. The cam lever is provided with accessible thumb tabs 112 for use in rotating the cam lever about the axis of the rivet 96.

The two cam levers 106 are used for locking the stroller in the unfolded, operating position shown by the full lines in FIGS. 3 and 7. As shown, when the stroller is in the operating position, the cam levers 106 are rotatable about the rivets 96 to position the rounded cam surface 108 within aligned slots 114 formed on the undersides of the side frames 12. This securely locks the slide lock assemblies 98 in position above the seat 22, and thereby also securely locks the bottom and rear X-frames 64 and 82 in an angular relationship to form a generally triangular structure as viewed in FIG. 3 for supporting the seat 22 in an operating position.

When the cam levers 106 are rotated to the dotted line position as shown in FIG. 7 with their flat surfaces 110 adjacent the side frame slots 114, the sleeves 100 of the slide lock assemblies 98 are slidable upwardly and rearwardly away from the seat 22 along the side frames 12 to collapse the stroller. This folded, collapsed position is shown in FIG. 8 and by the dotted lines in FIG. 3. Importantly, the side frames 12 fold laterally inwardly toward each other. The bottom X-frame 64 and the rear X-frame 82 assume end-to-end, substantially coplanar positions adjacent to and generally parallel with the side frames 12. The side struts 14 assume a position generally coplanar with the rear X-frame 64. Thus, in the folded position, the stroller assumes an extremely compact profile and is easily carried. The X-frames 64 and 82 extend substantially the entire length of the side frames and are connected to the side frames at their extreme opposite ends to thereby eliminate the need for conventional separate locking apparatus for maintaining the stroller in a folded position. However, if such additional locking means is desired, slots (not shown) can be formed in the underside of the side frames 12 near the handles 24 thereof for receiving the rounded cam surfaces 108 of the cam levers 106 for locking the stroller in the folded position.

The stroller 10 is returned to the unfolded operating position by pushing downwardly on the rear wheels 20. This causes the slide lock assemblies 98 to slide downwardly over the side frames 12 toward the seat 22 until they are adjacent the slots 114 in said side frames. Simultaneously, the side frames 12, the side struts 14, and the bottom and rear X-frames 64 and 82 move to their operating positions as viewed in FIGS. 1 and 3.

As shown in FIGS. 1 and 3-5, the fabric seat 22 comprises the base portion 62 and an upwardly and rearwardly extending back portion 116. The base portion 62 is of double thickness along the front edge thereof, and has longitudinally extending bar tacks 118 near the brackets 60 of the side struts 14 and a transversely extending front seam 120. Accordingly, loops are formed for reception over the front ends of said brackets 60.

The base portion 62 of the seat is formed integrally with the back portion 116 which extends upwardly and rearwardly to a point slightly below the slots 114 in the side frames 12. The sides of the back portion are fixed to the side frames by screws 122, and are looped about the side frames and bar tacked as at 125.

A safety belt 124 for the seat 22 is provided, and comprises a crotch strap 126 centrally fixed to the front edge of the base portion 62 by a seam 128. The crotch strap 124 extends rearwardly over the base portion 62, and terminates with a loop 130 for receiving the ends of safety belt halves 132 having a buckle 134. Importantly, the belt halves 132 are bar tacked, as at 137, at the sides of the seat back portion 116 and again, as at 136, at the rear corners of the base portion 62. From there, the belt halves 132 extend downwardly and rearwardly, and are wrapped about their adjacent side struts 14 prior to connection thereto by screws 138. The lengths of the belt halves 132 are carefully chosen so that the rear corners of the seat base portion 62 are pulled downwardly and rearwardly as the stroller is moved into the unfolded operating position. In this manner, the seat is pulled to the proper operating position each time the stroller is unfolded. Moreover, the belt halves prevent the base portion 62 of the seat from slipping fowardly off the side strut brackets 60. Of course, when the stroller is moved to the folded position, the seat 22 hangs loosely between the side frames 12.

An alternate embodiment of the stroller of this invention is shown in FIGS. 9 and 10. As shown, this alternate embodiment comprises a modified front wheel assembly 140 connected to the lowermost end of an elongated modified side frame 142. While only one of the modified wheel assemblies 140 and side frames 142 are shown, it is understood that both side frames and front wheel assemblies for the stroller are similarly modified. As shown, each side frame 142 extends angularly downwardly and forwardly toward the front wheel assembly 140 when the stroller is in the unfolded operation position, and then turns horizontally forwardly as at 144 to form a horizontal stretch to which the footrest 48 is fastened by the screw 50. Then, the side frame 142 again turns downwardly to form a generally vertical portion 146 having a U-shaped axle 148 carried therein. As shown in FIG. 9, the U-shaped axle has a front wheel 150 rotatably carried on one leg 152 thereof and interposed between a locking hub cap 154 and lock washer 153, and the outside face of the adjacent side frame. The axle leg 152 extends through a hole 156 in the side frame and then turns back toward the side frame to form another leg 158 received in an adjacent hole 160 in the side frame. The axle 148 is solidly fixed to the side frame adjacent both holes 156 and 160 by welds 162.

Another modified front wheel assembly 114 for the stroller is shown in FIG. 11. In this modification, the side frames 142 are identical with those of the embodiment of FIGS. 9 and 10. An axle 166 is received through a hole 168 in the lower end of each side frame 142, and said axle rotatably carries a pair of front wheels 170 on opposite faces of the side frames. Each of the wheels 170 is interposed between the adjacent side frame, and a locking hub cap 172 and lock washer 171 whereby each front wheel assembly 164 comprises a dual wheel assembly having a pair of front wheels 170.

We claim:

1. A collapsible stroller movable between an unfolded operating position and a collapsed folded position comprising a pair of elongated parallel side frames having upper and lower ends; a front wheel connected to the lower end of each said side frame; a side strut having upper and lower ends and pivotally connected near its upper end to each said side frame intermediate the length of said side frame; a rear wheel connected to the lower end of each said side strut; a flexible seat mounted on said side frames; a bottom X-frame pivotally connected between said side frames and said side struts adjacent their respective lower ends; a slide assembly slidably carried on each said side frame above said seat; a rear X-frame pivotally connected between said side struts adjacent their lower ends and said slide assemblies; and locking means for releasably locking said slide assemblies in a first position for locking the stroller in an unfolded operating position with said bottom and rear X-frames angularly disposed with respect to each other, said slide assemblies being movable along said side frames away from said seat when said locking means is unlocked toward a second position for placing the stroller in a collapsed folded position with said bottom and rear X-frames disposed end-to-end in substantially a common plane generally parallel with the plane of said side frames.

2. A collapsible stroller as set forth in claim 1 wherein said side frames extend from their upper ends generally downwardly and forwardly when the stroller is in the unfolded operating position, said side struts extending from their upper ends generally downwardly and rearwardly.

3. A collapsible stroller as set forth in claim 1 wherein said side struts are movable to a position substantially coplanar with said bottom X-frame when the stroller is moved to the collapsed folded position.

4. A collapsible stroller as set forth in claim 1 wherein said front wheels are mounted on swivel means, and said swivel means are connected to the lower ends of said side frames.

5. A collapsible stroller as set forth in claim 1 including a flexible footrest connected to the lower ends of said side frames and extending transversely therebetween.

6. A collapsible stroller as set forth in claim 1 wherein said bottom and rear X-frames are pivotally connected about a common axis to said side struts adjacent the lower ends of said side struts.

7. A collapsible stroller as set forth in claim 1 wherein said seat is connected between and supported by said side frames and said side struts.

8. A collapsible stroller as set forth in claim 7 wherein said seat comprises a base portion and a back portion, said base portion being connected to said side struts and said back portion being connected to said side frames above said side struts.

9. A collapsible stroller as set forth in claim 7 wherein the upper ends of said side struts extend beyond said side frames for supporting said seat.

10. A collapsible stroller as set forth in claim 1 wherein said seat is movable between an operating position when the stroller is in an unfolded operating position, and an inoperative position hanging relatively loosely between said side frames when the stroller is in a collapsed folded position.

11. A collapsible stroller as set forth in claim 10 including a belt connected between said seat and one of said side struts at a point behind said seat, said belt having a length whereby said seat is pulled to said operating position whenever the stroller is in said operating position.

12. A collapsible stroller as set forth in claim 1 including a pair of belts connected between said seat and said pair of side struts at positions behind said seat, said belts each having a length whereby said seat is pulled to an operating position whenever the stroller is in an unfolded operating position.

13. A collapsible stroller as set forth in claim 1 including a safety belt connected to said seat.

14. A collapsible stroller as set forth in claim 1 including a safety belt connected to said side struts.

15. A collapsible stroller as set forth in claim 14 wherein said safety belt comprises a pair of belt halves connected to said seat and to said side struts at positions behind said seat, said belt halves extending forwardly of said seat and having buckle means for interconnecting said belt halves, the portions of said belt halves between said seat and said side struts having a length whereby said seat is pulled to an operating position whenever the stroller is in an unfolded operating position.

16. A collapsible stroller as set forth in claim 1 wherein said locking means comprises a cam lever having a protruding cam surface and being rotatably mounted on one of said slide assemblies, said cam lever being rotatable when said one slide assembly is in said first position for engaging said cam surface with a slot formed in the adjacent side frame for releasably locking said slide assemblies.

17. A collapsible stroller as set forth in claim 1 wherein said locking means comprises a pair of cam levers rotatably mounted on said pair of slide assemblies, said cam levers each having a protruding cam surface and being rotatable when said slide assemblies are in said first positions for registering said cam surface with a slot formed in the adjacent side frame for releasably locking said slide assemblies.

18. A collapsible stroller as set forth in claim 17 wherein said rear X-frame and said pair of cam levers are connected about a common axis to said slide assemblies.

19. A collapsible stroller as set forth in claim 1 wherein the upper ends of said side frames are curved to form handle portions for the stroller.

20. A collapsible stroller movable between an unfolded operating position and a collapsed folded position comprising a pair of elongated parallel side frames having upper and lower ends; a pair of front wheels connected to the lower ends of said side frames; a pair of side struts having upper and lower ends and being pivotally connected near their upper ends to said side frames intermediate the lengths of said side frames; a pair of rear wheels connected to the lower ends of said side struts; a flexible seat having a base portion connected to said side struts and a back portion connected to said side frame above said side struts; a bottom X-frame pivotally connected between said side frames and said side struts adjacent their respective lower ends; a pair of slide assemblies slidably carried on said side frames above said seat; a rear X-frame pivotally connected between said side struts adjacent their lower ends and said slide assemblies; locking means for releasably locking said slide assemblies in a first position for locking the stroller in an unfolded operating position with said bottom and rear X-frames angularly disposed with respect to each other, said slide assemblies being movable along said side frames away from said seat when said locking means is unlocked toward a second position for placing the stroller in a collapsed folded position with said bottom and rear X-frames disposed end-to-end in substantially a common plane generally parallel with the plane of said side frames and said side struts substantially coplanar with said bottom X-frame; and belt means connected between said seat and one of said side struts at a point behind said seat, said belt means having a length whereby said seat is pulled to said operating position whenever the stroller is in said operating position.

21. A collapsible stroller as set forth in claim 20 wherein said belt means comprises a pair of belt halves connected between said side struts and said seat, said belt halves extending forwardly of said seat and having buckle means for interconnecting said belt halves to form a safety belt for the stroller.

22. A collapsible stroller movable between an unfolded operating position and a collapsed folded position comprising a pair of elongated parallel side frames having upper and lower ends; a pair of front wheels connected to the lower ends of said side frames; a pair of side struts having upper and lower ends and being pivotally connected near their upper ends to said side frames intermediate the lengths of said side frames; a pair of rear wheels connected to the lower ends of said side struts; a flexible seat mounted on said side frames; a collapsible bottom X-frame pivotally connected between said side frames and said side struts adjacent their respective lower ends; a pair of slide lock assemblies slidably carried on said side frames above said seat; and a collapsible rear X-frame pivotally connected between said side struts adjacent their lower ends and said slide lock assemblies, said slide lock assemblies being slidably movable along said side frames between a first position for placing the stroller in an unfolded operating position with said bottom and rear X-frames angularly disposed with respect to each other, and a second position for placing the stroller in a collapsed folded position with said bottom and rear X-frames disposed end-to-end in substantially a common plane generally parallel with the plane of said side frames and said side struts substantially coplanar with said bottom X-frame, said slide lock assemblies being releasably lockable when in said first position for releasably locking the stroller in the unfolded operating position.

* * * * *